(12) United States Patent
Shimamoto et al.

(10) Patent No.: US 7,948,738 B2
(45) Date of Patent: May 24, 2011

(54) ELECTRODE MATERIAL FOR ELECTRIC DOUBLE LAYER CAPACITOR AND PROCESS FOR PRODUCING THE SAME, ELECTRODE FOR ELECTRIC DOUBLE LAYER CAPACITOR, AND ELECTRIC DOUBLE LAYER CAPACITOR

(75) Inventors: Hideki Shimamoto, Kyoto (JP); Chiho Yamada, Osaka (JP); Kouhei Okuyama, Ashiya (JP); Hisatsugu Izuhara, Izumi (JP); Mitsumasa Hijiriyama, Kobe (JP)

(73) Assignee: Panasonic Corporation, Kadoma-shi (JP)

( * ) Notice: Subject to any disclaimer, the term of this patent is extended or adjusted under 35 U.S.C. 154(b) by 294 days.

(21) Appl. No.: 11/887,900

(22) PCT Filed: Apr. 6, 2006

(86) PCT No.: PCT/JP2006/307366
§ 371 (c)(1),
(2), (4) Date: Oct. 4, 2007

(87) PCT Pub. No.: WO2006/109690
PCT Pub. Date: Oct. 19, 2006

(65) Prior Publication Data
US 2009/0026422 A1    Jan. 29, 2009

(30) Foreign Application Priority Data
Apr. 8, 2005    (JP) ................ 2005-112639

(51) Int. Cl.
*H01G 9/00*    (2006.01)
*H01G 9/02*    (2006.01)
*H01G 9/04*    (2006.01)

(52) U.S. Cl. ........ 361/502; 361/503; 361/505; 361/508; 361/516; 361/523

(58) Field of Classification Search .................. 252/502; 361/502, 505, 517, 535, 305; 429/231.95, 429/229
See application file for complete search history.

(56) References Cited

U.S. PATENT DOCUMENTS
5,953,204 A * 9/1999 Suhara et al. ................. 361/502

FOREIGN PATENT DOCUMENTS

| JP | 05-085711 | | * | 4/1993 |
|---|---|---|---|---|
| JP | 2000-353642 | A | | 12/2000 |
| JP | 2001-146410 | A | | 5/2001 |
| JP | 2002-196269 | A | | 7/2002 |
| JP | 2002-222741 | A | | 8/2002 |
| JP | 2004-221425 | A | | 8/2004 |
| JP | 2004-342778 | | * | 12/2004 |
| JP | 2004-342778 | A | | 12/2004 |
| JP | 2004342778 | | * | 12/2004 |

OTHER PUBLICATIONS

Egashira et al., "Carbon framework structures produced in the Fullerene related materials," Carbon 38, 2000, pp. 615-621.
Egashira et al., "Properties of Fullerene-soot as the Electrode of Electrical Double-layer Capacitor," Battery Symposium in Japan, 1990, pp. 221-222.

* cited by examiner

*Primary Examiner* — Ling-Siu Choi
*Assistant Examiner* — Monique Peets
(74) *Attorney, Agent, or Firm* — Birch, Stewart, Kolasch & Birch, LLP (57) ABSTRACT

The present invention provides an electrode material for an electric double layer capacitor which can provide an electric double layer capacitor having a low internal resistance and a large capacitance, a process for producing the same, and an electrode for an electric double layer capacitor and an electric double layer capacitor using the same. The electrode material of the present invention is characterized by comprising a carbonaceous material and an activated carbon, the carbonaceous material obtained by thermal-treating or activating a fullerene-containing soot or an extracted residue obtained by substantially extracting at least a part of fullerene from a fullerene-containing soot using a solvent. The electrode for an electric double layer capacitor and the electric double layer capacitor of the present invention is characterized by using the electrode material.

15 Claims, 2 Drawing Sheets

ELECTRODE MATERIAL FOR ELECTRIC DOUBLE LAYER CAPACITOR AND PROCESS FOR PRODUCING THE SAME, ELECTRODE FOR ELECTRIC DOUBLE LAYER CAPACITOR, AND ELECTRIC DOUBLE LAYER CAPACITOR

TECHNICAL FIELD

The present invention relates to an electric double layer capacitor and an electrode and an electrode material used for the electric double layer capacitor.

BACKGROUND ART

An electric double layer capacitor has started to be used for backing up memory of information a device, and further, for an automobile and the like. With respect to an automobile for which a significantly increasing use is expected, an electric double layer capacitor having a low internal resistance is desired since it is effective to use as large electric current as possible in charging and discharging an electric double layer capacitor. In general, the larger a current density in charging and discharging an electric double layer capacitor is, the smaller a capacitance thereof becomes, and the higher a resistance of an electric double layer capacitor is, the larger a decrease in a capacitance becomes. In this respect, it cannot be said that a conventional electric double layer capacitor has a sufficiently low internal resistance, so that a usage in which a large electric current is used such as an automobile has been limited. In general, since an internal resistance of an electric double layer capacitor is mainly controlled by a resistance of an electrode and electric conductivity of an electrolyte solution, a method for lowering the resistance of the electrode and a method for selecting the electrolyte has been attempted.

However, in many cases, there has been a problem in that if an activated carbon having a large capacitance is used as an electrode material for an electric double layer capacitor, an internal resistance of a resultant electric double layer capacitor becomes high. In response to such problems, for example, Japanese Patent Laid-open Publication No. 2002-222741 proposes a method for obtaining an electrode which is a polarizable electrode having a low resistance and a high capacity by enhancing dispersibility of an activated carbon powder and a conductive agent to improve compression force and shear strength. Further, for providing an electric double layer capacitor with well-balanced properties having a large capacitance and a low internal resistance, Japanese Patent Laid-open Publication No. 2000-353642 proposes a method by blending a multiple kinds of activated carbons having different properties such as an activated carbon having a small capacitance and lowering an internal resistance of a resultant capacitor and an activated carbon having a large capacitance and increasing an internal resistance of a resultant capacitor.

Incidentally, in recent years, new carbon materials such as a soot containing fullerene and a residue obtained by extracting the fullerene therefrom have drawn attention, and have been examined for use as an electrode material for an electric double layer capacitor and a secondary battery (Japanese Patent Laid-open Publication No. 2004-221425, Minato Egashira et al, "Carbon framework structures produced in the Fullerene related materials" "Carbon 38 (2000)615-621").

DISCLOSURE OF THE INVENTION

For example, as in a method described in Japanese Patent Laid-open Publication No. 2000-353642, in technology of blending an activated carbon having a large capacitance and a high internal resistance and an activated carbon having a small capacitance and a low internal resistance, only an electrode material having intermediate properties with averaged capacitance and internal resistance could be obtained.

The present invention is accomplished in view of the above circumstances; an object of the present invention is to provide an electrode material for an electric double layer capacitor by devising an electrode material using a new carbonaceous material, having a low internal resistance and a large capacitance of the resultant electric double layer capacitor and a process for producing the same, and an electrode for electric double layer capacitor and an electric double layer capacitor using the same.

The electrode material for electric double layer capacitor of the present invention that has solved the above problems is characterized by containing a carbonaceous material and an activated carbon, the carbonaceous material obtained by thermal-treating or activating a fullerene-containing soot or an extracted residue obtained by substantially extracting at least a part of fullerene from the fullerene-containing soot using a solvent. An electrode material which lowers an internal resistance of a resultant electric double layer capacitor while keeping a large capacitance can be obtained by blending the carbonaceous material and the activated carbon. Specifically, a resistance of the electrode material for electric double layer capacitor is equivalent to or lower than a resistance of the carbonaceous material or a resistance of the activated carbon, whichever is lower. An embodiment wherein the resistance of the electrode material for electric double layer capacitor to be obtained is equivalent to or lower than the resistance of the carbonaceous material or the resistance of the activated carbon used, whichever is lower, is a highly excellent embodiment in that it is not an intermediate property obtained by averaging the resistance of the carbonaceous material and the activated carbon but a synergistic effect by blending them is acknowledged. Here, "the resistance of the electrode material for electric double layer capacitor", "the resistance of the carbonaceous material", and "the resistance of the activated carbon" mean "the internal resistance of the electric double layer capacitor obtained by using the electrode material for electric double layer capacitor as an electrode material", "the internal resistance of the electric double layer capacitor obtained by using the carbonaceous material as an electrode material", and "the internal resistance of the electric double layer capacitor obtained by using the activated carbon as an electrode material", respectively.

The solvent substantially extracting at least a part of the fullerene can include, for example, an aromatic organic solvent.

A content of the carbonaceous material in the electrode material for electric double layer capacitor of the present invention is preferably 30% by mass or less, more preferably 10% by mass or less. By making the content 30% by mass or less, a capacitance of the resultant electrode material for electric double layer capacitor will be 85% or more of a capacitance of the carbonaceous material or a capacitance of the activated carbon, whichever is higher. By making the content 10% by mass or less, a capacitance of the resultant electrode material for electric double layer capacitor will be 95% or more of the carbonaceous material or the activated carbon, whichever is the higher, and in many cases, it will be 100% or more (equivalent or more).

The process for producing the electrode material for electric double layer capacitor of the present invention is characterized by blending a carbonaceous material and an activated carbon, the carbonaceous material obtained by thermal-treating or activating a fullerene-containing soot or an extracted residue obtained by substantially extracting at least a part of fullerene from the fullerene-containing soot using a solvent.

The electrode for electric double layer capacitor of the present invention is characterized by using the electrode material, and further, the electric double layer capacitor of the present invention is characterized by using the electrode.

According to the present invention, an internal resistance of the electric double layer capacitor to be obtained can be lowered while keeping a large capacitance of a conventional activated carbon.

BRIEF DESCRIPTION OF THE DRAWINGS

FIG. 1 (a) is an illustration view showing an example of a roll-type electric double layer capacitor element; FIG. 1 (b) is an illustration view showing an example of an electric double layer capacitor using the capacitor element.

BEST MODE FOR CARRYING OUT THE INVENTION

The electrode material for electric double layer capacitor of the present invention is characterized by containing a carbonaceous material and an activated carbon, the carbonaceous material obtained by thermal-treating or activating a fullerene-containing soot or an extracted residue obtained by substantially extracting at least a part of fullerene from the fullerene-containing soot using a solvent.

(1) First, the fullerene-containing soot or the extracted residue obtained by substantially extracting at least a part of fullerene from the fullerene-containing soot using a solvent used in the present invention will be explained. In the following explanation, "the fullerene-containing soot or the extracted residue obtained by substantially extracting at least a part of fullerene from the fullerene-containing soot using a solvent" may be occasionally abbreviated simply as "fullerene-containing soot and the like".

Fullerene is, as well known, a carbon molecule having a hollow shell-like structure with a closed network of 5-membered rings and 6-membered rings, and may include, for example, $C_{60}$, $C_{70}$, $C_{76}$, $C_{78}$, $C_{80}$, $C_{82}$, $C_{84}$, $C_{86}$, $C_{88}$, $C_{90}$, $C_{92}$, $C_{94}$, $C_{96}$, $C_{180}$, $C_{240}$, $C_{320}$, and $C_{540}$, or a mixture thereof. The fullerene-containing soot is not particularly limited as long as it is a soot formed during a production of fullerene. Methods for producing fullerene may include, for example, a method vaporizing a raw material by arc discharge using graphite electrode and the like (arc discharging), a method vaporizing a raw material by applying high current to a carbonaceous raw material (resistance heating), a method irradiating graphite with ultraviolet laser (laser vaporization method), a method subjecting a carbon-containing compound such as benzene to incomplete combustion (combustion method) and the like, and the soot containing fullerene can be obtained by any of the methods. In the fullerene-containing soot, in addition to the above-mentioned fullerene, a precursor of fullerene which has not been formed into a closed ring structure like fullerene, graphite and carbon containing graphite structure, noncrystalline carbon, amorphous carbon, carbon black, polycyclic aromatic hydrocarbon and the like are included (Minato Egashira et al, "Carbon framework structures produced in the Fullerene related materials" "Carbon 38 (2000) 615-621").

Specific examples of the fullerene-containing soot may include a fullerene-containing soot containing 10% or more of $C_{60}$ obtained by arc discharging or laser vaporization method and a fullerene-containing soot containing 5% by mass or more of toluene-soluble fullerene.

In the present invention, an extracted residue obtained by substantially extracting at least a part of fullerene from the fullerene-containing soot using a solvent can be used. The extracted residue obtained by substantially extracting at least a part of fullerene from the fullerene-containing soot using a solvent means a residue obtained by substantially extracting a solvent-soluble fullerene component in fullerene components included in the fullerene-containing soot. For example, fullerene having $C_{60}$ to $C_{70}$ carbon atoms is soluble into an after-mentioned solvent, and it is extracted from the fullerene-containing soot with a solvent. It is considered that the extracted residue obtained by substantially extracting at least a part of fullerene from the fullerene-containing soot using a solvent include the precursor of fullerene, the graphite and the carbon having a graphite structure, the noncrystalline carbon, the amorphous carbon, the carbon black, higher fullerene of $C_{70}$ or higher and the like.

According to Minato Egashira et al, "Carbon framework structure produced in the Fullerene related material (*Fullerene kanren busshitsuni seizo sareru tanso kokkaku kozo*)" in "Carbon (Tanso) 38 (2000)615-621", a percentage of a toluene-soluble part in a fullerene-containing soot obtained by arc discharging using a graphite electrode was 10% composed of 70% of $C_{60}$, 22% of $C_{70}$ and a small amount of higher fullerene of $C_{76}$ to $C_{120}$, and in the toluene-insoluble part, there was a cluster of $C_{70}$ to $C_{400}$ having a structure similar to $C_{60}$ or $C_{70}$. Further, a graphite-like material is separated by further adding acetone to the toluene-insoluble part, an amount of which is 15% of the fullerene-containing soot.

The solvent used for substantially extracting at least a part of fullerene from the fullerene-containing soot using the solvent may include an organic solvent such as aromatic hydrocarbon, aliphatic hydrocarbon, and chlorinated hydrocarbon. Such examples may include an aromatic organic solvent such as benzene, toluene, xylene, 1-methylnaphthalene, 1,2,4-trimethyl benzene and tetralin, and among them, toluene is preferred. If toluene is used, fullerene of about $C_{60}$ to $C_{120}$ can be extracted.

A method for obtaining the extracted residue by substantially extracting at least a part of fullerene from a fullerene-containing soot using the solvent may include, for example, a following method. First, into the fullerene-containing soot, the solvent in an amount of about 60 times by mass of the soot was added to prepare a dispersion liquid of the fullerene-containing soot, and the dispersion liquid is treated by ultrasonic at a room temperature for 1 hour to dissolve a solvent-soluble fullerene component and other solvent-soluble part into the solvent. Next, the dispersion liquid of the fullerene-containing soot is filtrated and, further, the fullerene-containing soot is washed with the solvent until no color remained in a filtrate to substantially extract at least a part of fullerene that is soluble into the solvent and another solvent-soluble part and subjecting the resultant extracted residue to drying in a vacuum at about 60° C.

(2) Next, a carbonaceous material obtained by thermal-treating or activating the fullerene-containing soot or the extracted residue obtained by substantially extracting at least a part of the fullerene from the fullerene-containing soot with the solvent will be explained.

The "activation treatment" in the present invention is not particularly limited as long as it is a treatment which makes the fullerene-containing soot and the like porous and which increases a specific surface area of the fullerene-containing soot and the like; for example, chemical activation treatment, gas activation treatment and the like may be employed.

The chemical activation treatment can be carried out, for example, by mixing the above-described fullerene-containing soot and an alkali metal compound as an activating agent and subjecting the mixture to heat treatment. Examples of the alkali metal compound may include an alkali metal hydroxide such as potassium hydroxide and sodium hydroxide; an alkali metal carbonate such as potassium carbonate and sodium carbonate; sulfate of an alkali metal such as potassium sulfate and sodium sulfate and the like and an aqueous solution and a hydrate thereof and the like. As the activating agent, a hydrate and a thick aqueous solution of an alkali metal hydroxide such as potassium hydroxide and sodium hydroxide are preferred. An amount of the alkali metal compound to be used relative to the fullerene-containing soot and the like is not particularly limited, but preferably, for example, a ratio of the alkali metal compound to the fullerene-containing soot and the like (mass ratio) is 0.3 or more and 4.0 or less using an anhydrous standard.

Heat treatment for carrying out the chemical activation is not particularly limited, but it can be carried out, for example, at 500° C. or higher and 900° C. or lower, and it is also a preferred embodiment to carry out the heat treatment under an atmosphere of an inert gas such as argon and nitrogen. Additionally, in a case of carrying out the chemical activation using the alkali metal hydroxide and the like, it is a preferred embodiment to remove an unreacted activating agent and an alkali metal compound (for example, potassium compound) resulted from the reaction which are present in the fullerene-containing soot and the like by cleaning with acid and/or water. The carbonaceous material washed using acid and/or water is preferably subjected to drying in a vacuum. It is because the acid and/or water remaining in the carbonaceous material can be easily removed by drying in a vacuum.

In the present invention, the fullerene-containing soot can be subjected to gas activation treatment. A preferred embodiment of the gas activation treatment is carried out, for example, by bringing the above-mentioned fullerene-containing soot and the like in contact with oxidized gas at 750° C. or higher. A temperature of the gas activation treatment is preferably 800° C. or higher, more preferably 850° C. or higher, and preferably 1100° C. or lower, more preferably 1050° C. or lower. As the oxidized gas, for example, a carbon dioxide gas, water vapor, oxygen, a combustion exhaust gas and a mixture thereof may be used.

Additionally, in the present invention, porous carbon which is made porous at a practical level can be obtained by simply thermal treating the above mentioned fullerene-containing soot and the like, too. A detailed mechanism of making the fullerene-containing soot and the like porous by thermal treatment is unknown, but one cause may be that a part of fullerene included in the fullerene-containing soot sublimes during thermal treatment so that a part wherein the fullerene used to be present becomes hollow, resulting in making the fullerene-containing soot and the like become porous. A temperature for thermal treatment in the embodiment is not particularly limited, but it is preferably at 750° C. or higher, more preferably at 800° C. or higher and preferably at 2800° C. or lower, more preferably at 2200° C. or lower. It is because if the temperature for thermal treatment is too low, a degree of pore development becomes too low, and if the temperature for thermal treatment is too high, a pore which once developed is reduced so that a specific surface area thereof may adversely become small.

Thermal treatment of the fullerene-containing soot and the like is preferably carried out under an inert atmosphere. It is preferably carried out under a substantially inert atmosphere, for example, under an inert atmosphere of nitrogen, argon and the like, by burning in a container around which carbon susceptible to oxidation is placed or in a crucible comprising carbon. The thermal treatment can also be carried out, for example, under a reduced pressure (in vacuum).

In the thermal treatment of the embodiment, the thermal treatment and the activation treatment can be carried out in combination. The thermal treatment and the gas activation treatment using oxidized gas can be suitably combined, such as an embodiment of carrying out gas activation treatment using oxidized gas subsequently after thermal treatment under an atmosphere of inert gas, and an embodiment of carrying out the thermal treatment subsequently after the gas activation treatment.

The carbonaceous material after the thermal treatment or the activation treatment may contain an organic solvent-soluble part. In particular, if it is used as an electrode material for electric double layer capacitor which uses an organic solvent as an electrolyte solution for driving the capacitor, it is also a preferred embodiment to clean the carbonaceous material to be obtained with an organic solvent to remove the organic solvent-soluble part in advance. It is for preventing the organic solvent-soluble part included in the resultant carbonaceous material from eluting in the organic solvent-based electrolyte solution for driving the capacitor. The organic solvent for cleaning the carbonaceous material may include toluene, benzene, or a publicly known organic solvent used for an electrolyte solution for driving an electric double layer capacitor. Additionally, the carbonaceous material washed using the organic solvent is preferably subjected to drying in a vacuum. It is because the organic solvent remaining in the carbonaceous material can be easily removed by drying in a vacuum.

Further, in the present invention, it is also a preferred embodiment to subject the carbonaceous material obtained by the thermal treatment or the activation treatment to heat treatment under an atmosphere of inert gas or under an atmosphere of an oxidized gas in order to adjust an amount of acid functional groups on a surface of the carbonaceous material. As the inert gas, for example, argon, nitrogen, and helium may be used, and as the oxidized gas, air and oxygen may be used. A temperature of the heat treatment is not particularly limited, but it is preferably at 100° C. or higher and 1000° C. or lower.

(3) A structure of the electrode material for electric double layer capacitor of the present invention will be explained.

The electrode material for electric double layer capacitor of the present invention contains a carbonaceous material and an activated carbon, the carbonaceous material obtained by thermal-treating or activating a fullerene-containing soot or an extracted residue obtained by substantially extracting at least a part of fullerene from the fullerene-containing soot using a solvent. By blending the carbonaceous material and the activated carbon, an internal resistance of the electric double layer capacitor using the resultant electrode material for electric double layer capacitor becomes equivalent to or lower than an internal resistance of an electric double layer capacitor which is obtained using either the carbonaceous material or the activated carbon, whichever is lower (property at room temperature). An embodiment wherein the resistance of the resultant electrode material for electric double layer capacitor is equivalent to or lower than the resistance of the carbonaceous material or the resistance of the activated carbon used, whichever is lower, is a highly excellent embodiment in that it is not an intermediate property obtained by averaging the resistance of the carbonaceous material and the activated carbon but a synergistic effect obtained by blending them is acknowledged.

The "activated carbon" used in the present invention is not particularly limited as long as it is a publicly known activated carbon, and may include one obtained by subjecting a phenol resin, coal, coconut husk, petroleum coke, coal coke, sawdust and the like to chemical activation treatment or gas activation treatment, more preferably one obtained by subjecting the phenol resin or the coke as a raw material to the chemical activation. Additionally, the "activated carbon" used in the present invention is defined as a carbonaceous material having a specific surface area of 1000 $m^2/g$ or higher. On the other hand, the carbonaceous material obtained by thermal-treating or activating the fullerene-containing soot or the extracted residue obtained by substantially extracting at least a part of fullerene from the fullerene-containing soot using a solvent is distinguished from the "activated carbon" used in the present invention in that it preferably has a specific surface area of 400 $m^2/g$ or more and less than 1000 $m^2/g$. The specific surface area can be determined using ASAP-2400, nitrogen adsorption equipment manufactured by Micromeritics Instrument Corporation and can be obtained by BET-multi-point method.

A content of the carbonaceous material in the electrode material for electric double layer capacitor of the present invention is preferably 30% by mass or less, more preferably 15% by mass or less, even more preferably 10% by mass or less, further preferably 7% by mass or less (0% is not included). A lower limit of the content of the carbonaceous material is not particularly limited, but it is 0.1% by mass, preferably 1% by mass. If the content of the carbonaceous material is in the above range, an electrode material capable of lowering an internal resistance of the resultant electric double layer capacitor while keeping a large capacitance can be obtained. Specifically, by making the content of the carbonaceous material 30% by mass or less, a capacitance of the resultant electrode material for electric double layer capacitor becomes 85% or more of a capacitance of the carbonaceous material or a capacitance of the activated carbon to be used, whichever is higher, and by making the content of the carbonaceous material 10% by mass or less, the capacitance of the resultant electrode material for electric double layer capacitor becomes 95% or more, in many cases 100% or more (equivalent or more) of a capacitance of the carbonaceous material or a capacitance of the activated carbon to be used, whichever is higher.

In an embodiment wherein a capacitance of the electrode material for electric double layer capacitor is 85% or more of a capacitance of the carbonaceous material or a capacitance of the activated carbon to be used, whichever is higher, lowering of an internal resistance of the resultant electric double layer capacitor without lowering the capacitance of the electrode material too much has been achieved. An embodiment wherein the capacitance of the resultant electrode material for electric double layer capacitor is 95% or more, in many cases 100% or more of a capacitance of the carbonaceous material or a capacitance of the activated carbon to be used, whichever is higher, is a highly excellent embodiment in that it is not an intermediate property obtained by averaging the capacitance of the carbonaceous material and the activated carbon but a synergistic effect obtained by blending them is acknowledged.

The electrode material for electric double layer capacitor of the present invention may further include an after-mentioned binder, a conductive agent and the like in addition to the above-mentioned carbonaceous material and the activated carbon.

(4) Next, an electric double layer capacitor and an electrode for electric double layer capacitor of the present invention will be explained.

The electrode for electric double layer capacitor of the present invention is not particularly limited as long as the electrode material for electric double layer capacitor of the present invention is used, and the electric double layer capacitor of the present invention is not particularly limited as long as it uses the electrode of the present invention. The electric double layer capacitor of the present invention is constituted by, for example, positioning a polarizable electrode using the electrode material for electric double layer capacitor of the present invention as a cathode and an anode via a separator (any polarizable electrode can be a cathode or an anode) so that the cathode and the anode are soaked in an electrolyte solution. In an electric double layer capacitor having such a constitution, for example, electric charge is accumulated at an interface between the electrolyte solution and the polarizable electrode.

Figure 1:
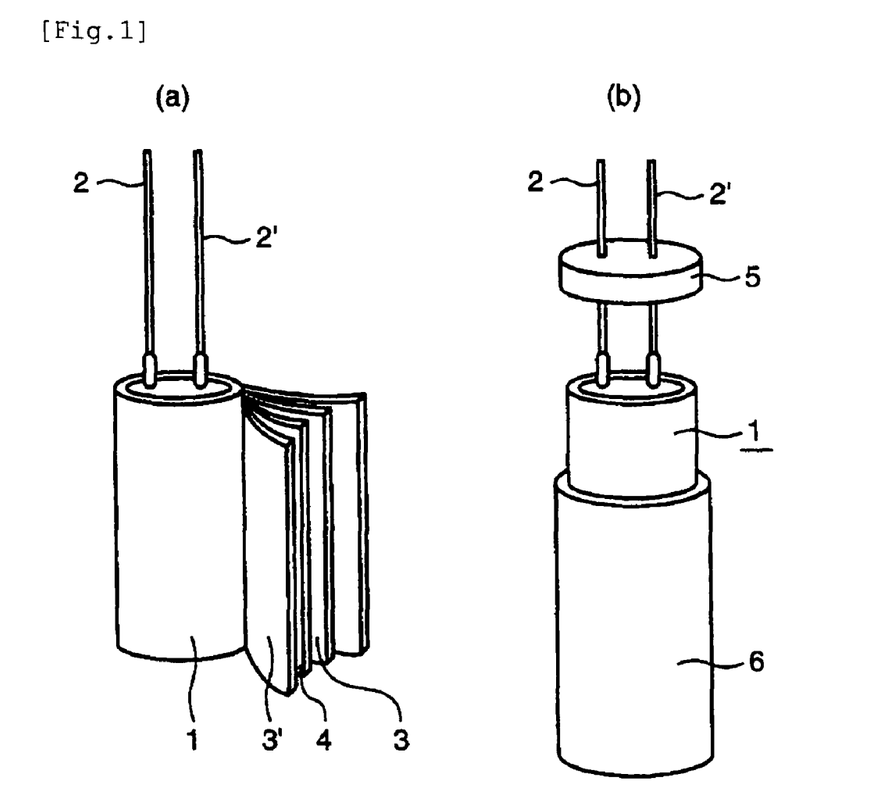

FIG. 1(*a*) is an illustration diagram showing an example of a structure and a constitution of a roll-type electric double layer capacitor element, and FIG. 1(*b*) is an illustration diagram showing an example of a structure and a constitution of an electric double layer capacitor using the capacitor element. The capacitor element 1 is formed by being rolled up with a polarizable electrode 3 connected with a pullout lead wire 2 and a polarizable electrode 3' connected with a pullout lead wire 2', with a separator 4 for preventing short-circuit interposed therebetween. The pullout lead wires 2 and 2' of the capacitor element 1 are provided with a sealing member 5 comprising a rubber. The capacitor element 1 is impregnated with the electrolyte solution for driving the capacitor, and then is stored in a metal case 6 having bottomed cylindrical shape constituted by aluminum. By the storage, the sealing member 5 is positioned at an opening of the metal case 6, and by subjecting the opening of the metal case 6 to drawing from the side and curling process, the sealing member 5 seals the opening of the metal case 6.

Figure 2:
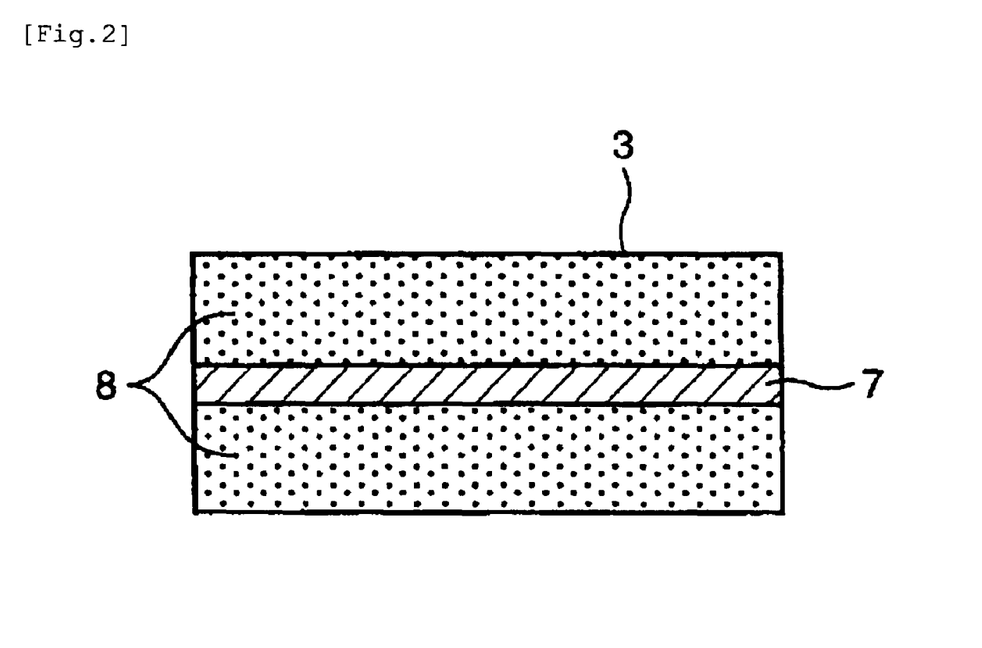
FIG. 2 is a cross section view showing an example of a polarizable electrode for the electric double layer capacitor of the present invention.

As the polarizable electrode 3, for example, one having an electrode material layer 8 attached to a current collector 7 as shown in FIG. 2 may be used.

The polarizable electrode using the electrode material can be produced by a publicly known method. For example, it can be obtained by kneading the electrode material, a conductive agent and a binder solution, and adding a solvent to make the mixture a paste, coating the paste on a current collector followed by removing the solvent. As the binder, a fluorine-based polymer compound such as polytetrafluoroethylene and polyvinylidene-fluoride and carboxy methylcellulose, styrene-butadiene rubber, petroleum pitch and a phenol resin may be used. Among them, as the binder, a water-soluble binder having high dispersibility and film-forming property such as carboxymethylcellulose (hereinafter referred to as "CMC") is preferably used.

An amount of the binder to be used is not particularly limited, but it is preferably 2% by mass to 8% by mass, more preferably 4% by mass to 6% by mass of the material constituting the polarizable electrode.

As the conductive agent, for example, a carbon black such as acetylene black and ketjen black may be used. A content of the conductive agent is not particularly limited, but it is preferably 8% by mass or less of the material constituting the polarizable electrode.

The electrolyte solution used for the electric double layer capacitor of the present invention is not particularly limited, and a publicly known electrolyte solution for the electric double layer capacitor may be used. Such examples may include a nonaqueous (organic-based) electrolyte solution, an aqueous electrolyte solution, and an ambient temperature molten salt. As the nonaqueous (organic-based) electrolyte solution, for example, an electrolyte solution obtained by dissolving amidine salt in an organic solvent such as propylene carbonate, ethylene carbonate, and methyl ethylcarbonate, an electrolyte solution in which quaternary ammonium salt of perchloric acid is dissolved, and an electrolyte solution in which quaternary ammonium or $BF_4$ salt and $PF_6$ salt of an alkali metal such as Li is dissolved, and an electrolyte solution in which quaternary phosphonium salt is dissolved may be used. As the aqueous electrolyte solution, for example, a sulfate aqueous solution and a potassium hydroxide aqueous solution may be used.

The separator used for the electric double layer capacitor is not particularly limited, but for example, a nonwoven fabric, a cloth, and a microporous film comprising, as a main component, cellulose, glass fiber, or a polyolefin such as polyethylene and polypropylene may be used.

EXAMPLES

Hereinafter, the present invention will be described in more detail with reference to Examples, but the present invention is not restricted by the following Examples and any modification and an implementation without departing from the scope of the invention are also included in the scope of the present invention.

[Evaluation Method]
(1) X-Ray Diffraction Measurement
X-ray diffraction measurement was carried out under following conditions.
X-ray diffraction measurement device: X'Pert PRO-type manufactured by Spectris
X-ray source: Cu—Kα ray (wave length: 1.54 Å), output: 40 KV40 mA, operation axis: θ/2θ, measurement mode: Continuous, measurement range: 2θ=5 to 80°, incorporation range: 0.01°, scan speed: 5.0°/min.
(2) Measurement of Specific Surface Area
Specific surface area was measured by ASAP-2400, nitrogen adsorption equipment manufactured by Micromeritics Instrument Corporation, and was obtained by BET-multipoint method.

Example 1

Electrode Material 1

A fullerene-containing soot (containing 10% or more of $C_{60}$) manufactured by Tokyo Progress System LTD. was heated to 950° C. under a nitrogen atmosphere using a rotary kiln, and was kept under an atmosphere in which a volume ratio of nitrogen to water vapor is 50/50 while maintaining at 950° C. for 10 minutes to carry out gas activation treatment followed by cooling, thereby obtaining a carbonaceous material 1. An average particle diameter of the resultant carbonaceous material 1 ($d_{50}$, hereinafter the same) was 7 μm, and a specific surface area thereof was 670 m²/g. The carbonaceous material 1 and a commercially available activated carbon A (manufactured by KANSAI COKE AND CHEMICALS CO., LTD., commercial name: Maxsorb, average particle diameter ($d_{50}$): 10 μm, specific surface area: 2330 m²/g) were blended in a manner that a content of carbonaceous materials became 5% by mass, thereby obtaining an electrode material 1.

Figure 3:
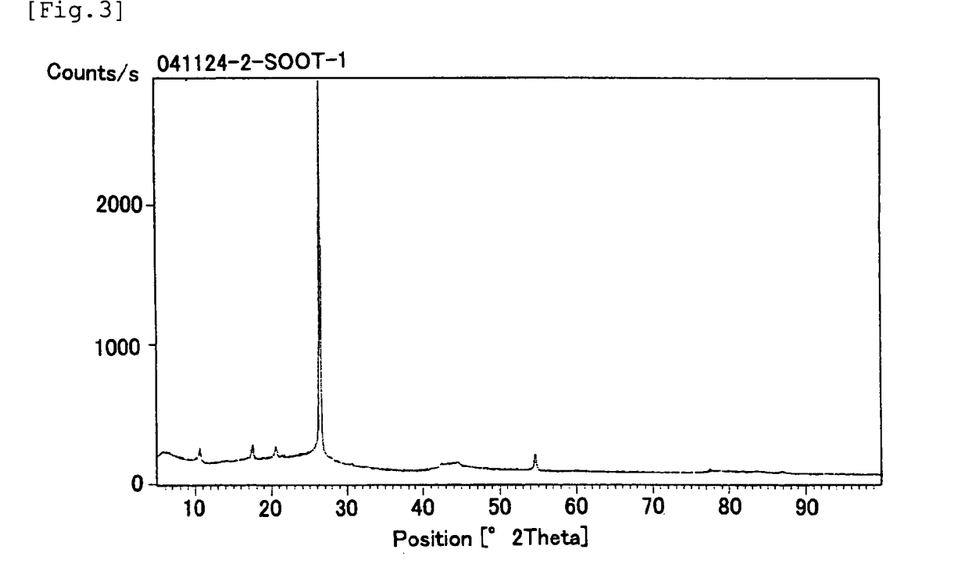
FIG. 3 is an X-ray diffraction pattern of a fullerene-containing soot used in the present invention.

Results of measuring X-ray diffraction of the fullerene-containing soot manufactured by Tokyo Progress System LTD. (containing 10% or more of $C_{60}$) are shown in FIG. 3. A peak derived from graphite was found near 27°, 44°, 55°, and a peak attributed to fullerene $C_{60}$ was found near 11°, 17°, and 21°, and further, a plateau-like rise of baseline attributed to noncrystalline carbon and amorphous carbon was found.

Electrode Material 2

Into a fullerene-containing soot (containing 10% or more of $C_{60}$) manufactured by Tokyo Progress System LTD., about 60 times the amount of toluene by mass was added to prepare a dispersion liquid of the fullerene-containing soot, and the dispersion liquid was treated by ultrasonic at a room temperature for 1 hour followed by filtrating the dispersion liquid, and further washing it until no color remained in the filtrate. The filtered material was subjected to drying in a vacuum at 60° C. for about 5 hours, thereby obtaining an extracted residue of the fullerene-containing soot which could be obtained by substantially extracting at least a part of fullerene using a solvent. The yield-ratio of the extracted residue to the fullerene-containing soot was 91%, and the extract contained 78% of $C_{60}$ and 18% of $C_{70}$ in accordance with measurement by liquid chromatography. The extracted residue was subjected to activation treatment using a rotary kiln in a same manner as the carbonaceous material 1, thereby obtaining a carbonaceous material 2. An average particle diameter of the resultant carbonaceous material 2 was 5 μm, and a specific surface area thereof was 590 m²/g. The resultant carbonaceous material 2 and the activated carbon A used for the electrode material 1 were blended in a manner that a content of carbonaceous materials became 10% by mass, thereby obtaining an electrode material 2.

Figure 4:
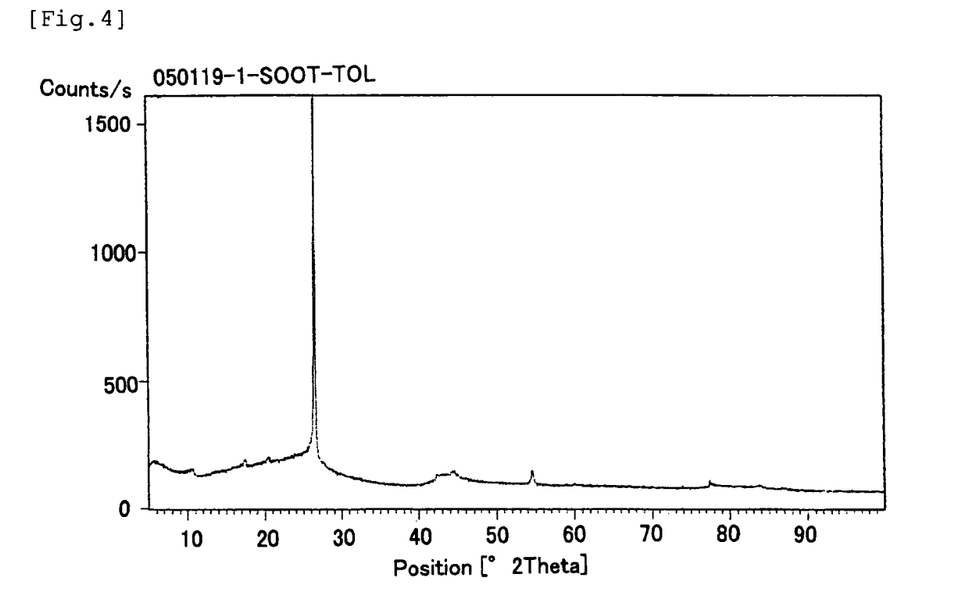
FIG. 4 is an X-ray diffraction pattern of an extracted residue obtained by substantially extracting at least a part of fullerene from the fullerene-containing soot used in the present invention using a solvent.

Results of measuring X-ray diffraction of the extracted residue obtained by substantially extracting at least a part of fullerene from the fullerene-containing soot using a solvent are shown in FIG. 4. From FIG. 4, it is found that a height of a peak near 11°, 17°, and 21° attributed to fullerene $C_{60}$ is relatively lower than that in FIG. 3 compared with a peak derived from graphite. From the results, it is found that the resultant extracted residue is obtained by substantially extracting $C_{60}$ and $C_{70}$ as at least a part of fullerene from the fullerene-containing soot.

Electrode Material 3

A fullerene-containing soot (containing 10% or more of $C_{60}$) manufactured by Tokyo Progress System LTD. was subjected to thermal treatment under a nitrogen atmosphere at 1000° C. or higher using a box-type electric furnace followed by cooling, thereby obtaining a carbonaceous material 3. An average particle diameter of the carbonaceous material 3 was 6 μm, and a specific surface area thereof was 520 m²/g. The resultant carbonaceous material 3 and the activated carbon A used for the electrode material 1 were blended in a manner that a content of carbonaceous materials became 10% by mass, thereby obtaining an electrode material 3.

Electrode Material 4

A commercially available coconut husk-activated carbon (commercial name: Amasorb manufactured by KN CAR- BON TECH CO., LTD., average particle diameter: 9 µm, specific surface area: 1310 m²/g) was used as a carbonaceous material 4, and the carbonaceous material 4 and the activated carbon A used for the electrode material 1 were blended in a manner that a content of the carbonaceous material 4 became 10% by mass, thereby obtaining an electrode material 4.

(Preparation of Electric Double Layer Capacitor)

A polytetrafluoroethylene binder (PTFE) and a carbon black were blended in each of the resultant electrode materials 1 to 4 in a manner that a ratio of the electrode material: PTFE:carbon black became 8:1:1 (mass ratio), and a pair of coin-like electrodes having a diameter of 26 mm and a thickness of 0.5 mm were prepared by pressing. After the pair of coin-like electrodes were vacuum-impregnated with an electrolyte solution (propylene carbonate solution of 1 mol of $(C_2H_5)_4NB_4$), they were bonded to each other via a polypropylene separator and were sandwiched between current collectors from both sides thereof, thereby preparing electric double layer capacitors 1 to 4. After the electric double layer capacitors 1 to 4 was charged at a charging voltage of 2.5 V for 30 minutes, electricity thereof was discharged at 10 mA. From a gradient of a discharge curve between 2.0 V and 1.5 V, a capacitance per mass of the activated carbon and per volume of the electrode was calculated. An internal resistance of the resultant electric double layer capacitor was calculated from voltage drop (IR drop) immediately after an onset of electric discharge. More specifically, a voltage obtained by extrapolating a linear portion between 2.0 V and 1.0 V of the discharge curve up to a point of starting the electric discharge was subtracted from 2.5 V to obtain a potential difference (V), and the potential difference (V) was divided by the discharging current (A), thereby obtaining the internal resistance ($\Omega$).

Results of evaluating a capacitance of each of the materials for electrode double layer capacitor 1 to 4 and an internal resistance of each of the electric double layer capacitors 1 to 4 are summarized in Table 1.

TABLE 1

| Evaluation Result | Capacitance | | Internal Resistance |
|---|---|---|---|
| | F/ml | F/g | $\Omega$ |
| Carbonaceous material 1 | 9.0 | 14 | 2.5 |
| Activated carbon | 20 | 43 | 3.8 |
| Electrode material 1 | 20 | 43 | 2.5 |
| Carbonaceous material 2 | 8.5 | 13 | 2.5 |
| Activated carbon | 20 | 43 | 3.8 |
| Electrode material 2 | 19 | 40 | 2.1 |
| Carbonaceous material 3 | 3.5 | 5.6 | 4.3 |
| Activated carbon | 20 | 43 | 3.8 |
| Electrode material 3 | 18 | 38 | 1.9 |
| Carbonaceous material 4 | 12 | 23 | 4.6 |
| Activated carbon | 20 | 43 | 3.8 |
| Electrode material 4 | 19 | 41 | 4.0 |

As clearly seen from Table 1, an internal resistance of each of the electric double layer capacitors 1 to 3 which are examples of the present invention is equivalent or less of the internal resistance of the electric double layer capacitor obtained by using one of the carbonaceous materials 1 to 3 or the activated carbons, whichever is lower. Additionally, a capacitance of each of the electrode materials 1 to 3 is 85% or more of the capacitance of the carbonaceous material 1 to 3 or the capacitance of the activated carbon, whichever is higher (activated carbon: 20 F/ml, 43 F/g). From the results, a synergistic effect obtained by blending the carbonaceous material and the activated carbon is acknowledged in the present invention, which is not simply an intermediate property obtained by averaging the resistance of the carbonaceous material and the activated carbon.

On the other hand, the resultant capacitance and internal resistance of the electric double layer capacitor 4 only exhibited intermediate properties obtained by averaging the capacitance and the internal resistance of each of the carbonaceous material and the activated carbon used.

Example 2

Preparation of Electrode Material

A commercially available activated carbon B (commercial name: Maxsorb manufactured by KANSAI COKE AND CHEMICALS CO., LTD., specific surface area: 2300 m²/g) and a carbonaceous material 5 having an average particle diameter of 7 µm and a specific surface area of 750 m²/g obtained in a same manner as the carbonaceous material 2 except for the activation time and a carbonaceous material 6 having an average particle diameter of 6 µm and a specific surface area of 460 m²/g obtained in a same manner as the carbonaceous material 3 were blended in such a manner that a blending quantity of each became the blending quantity described in Table 2 and Table 3, thereby obtaining electrode material 5 to 12.

The carbonaceous material 5 is equivalent to a carbonaceous material obtained by activating an extracted residue obtained by substantially extracting at least a part of fullerene from the fullerene-containing soot using a solvent, and the carbonaceous material 6 is equivalent to a carbonaceous material obtained by thermal treating the fullerene-containing soot.

(Preparation of Electric Double Layer Capacitor)

A water-soluble binder (commercially available CMC) and acetylene black were blended in each of the resultant electrode materials 5 to 12 in a manner that a ratio of the electrode material:CMC:acetylene black became 8:1:1 (mass ratio), and a resultant mixture was made to be a paste and was coated on a surface of an aluminum foil and dried, thereby preparing sheet-like electrodes 5 to 12.

Next, roll-type electric double layer capacitors 5 to 12 (rated voltage: 2.0 V-capacitance: 70 F, size: Φ18 mm×L50 mm) were prepared by being rolled up with each of the sheet-like electrodes 5 to 12 and separators (made of cellulose) in a manner that a separator for preventing short-circuit was interposed between sheets of the sheet-like electrodes. As the electrolyte solution, a propylene carbonate solution wherein ethyl methyl imidazolium boron tetrafluoride salt had been dissolved was used.

The electric double layer capacitors 5 to 12 were subjected to constant-current and constant-voltage charge at 1.5 Å and 2.0 V followed by discharging electricity at 1.0 Å. From a gradient of a discharge curve between 1.7 V and 1.3 V, a capacitance per volume thereof was calculated. An internal resistance of the resultant electric double layer capacitor was calculated from voltage drop (IR drop) immediately after an onset of the electric discharge. More specifically, a voltage obtained by extrapolating a linear portion between 1.7 V and 1.3 V of the discharge curve up to a point of starting the electric discharge was subtracted from 2.0 V to obtain a potential difference (V), and the potential difference (V) was divided by the discharging current (A), thereby obtaining the internal resistance per volume of the electrode. Results of measuring a capacitance of material for each of the electrode double layer capacitors 5 to 12 and an internal resistance of each of the electric double layer capacitors 5 to 12 at 25° C. and at −30° C. which is an even more severe evaluation condition by the above method are summarized in Table 2 and Table 3 respectively.

TABLE 2

| Evaluation Result | Blending quantity of Carbonaceous material Wt % | Capacitance F/ml 25° C. | Capacitance F/ml −30° C. | Internal resistance mΩ/ml 25° C. | Internal resistance mΩ/ml −30° C. |
|---|---|---|---|---|---|
| Activated carbon | 0 | 14.8 | 14.6 | 198.1 | 269.7 |
| Electrode material 5 | 2 | 16.1 | 14.8 | 135.1 | 163.4 |
| Electrode material 6 | 5 | 15.5 | 15.2 | 130.7 | 216.9 |
| Electrode material 7 | 10 | 14.8 | 14.9 | 132.4 | 250.8 |
| Electrode material 8 | 20 | 14.0 | 14.3 | 144.3 | 281.8 |
| Carbonaceous material 5 | 100 | 8.7 | 7.9 | 340.0 | 400.3 |

As clearly seen from Table 2, with respect to room temperature properties (25° C.), if a content of the carbonaceous material 5 is 20% by mass or less, the capacitance of the resultant electrode material for the electric double layer capacitor is 95% or more of the capacitance of the carbonaceous material or the capacitance of the activated carbon, whichever is higher (activated carbon in this case), and if a content of the carbonaceous material 5 is 10% by mass or less, it is 100% or more thereof. It is found that the internal resistance of the electric double layer capacitor obtained by using each of the electrode materials 5 to 8 is markedly lower than the internal resistance of the electric double layer capacitor obtained by using either the carbonaceous material or the activated carbon.

As a result of evaluation at −30° C., a tendency similar to the results evaluated at a room temperature was found in the electrode materials 5 to 8. Additionally, the internal resistance of the electric double layer capacitor obtained by using the electrode materials 5 to 7 became lower than the internal resistance of the electric double layer capacitor obtained by using either the carbonaceous material or the activated carbon, whichever is lower.

TABLE 3

| Evaluation Result | Blending quantity of Carbonaceous material Wt % | Capacitance F/ml 25° C. | Capacitance F/ml −30° C. | Internal resistance mΩ/ml 25° C. | Internal resistance mΩ/ml −30° C. |
|---|---|---|---|---|---|
| Activated carbon | 0 | 14.8 | 14.6 | 198.1 | 269.7 |
| Electrode material 9 | 2 | 15.5 | 15.0 | 141.4 | 258.0 |
| Electrode material 10 | 5 | 14.8 | 12.5 | 143.8 | 225.0 |
| Electrode material 11 | 10 | 14.0 | 12.3 | 136.0 | 348.3 |
| Electrode material 12 | 20 | 13.1 | 8.8 | 152.0 | 320.9 |
| Carbonaceous material 6 | 100 | 6.0 | 5.1 | 360.3 | 450.8 |

As seen from Table 3, if a content of the carbonaceous material 6 is 20% by mass or less, the capacitance of the resultant electrode material for the electric double layer capacitor is 85% or more of the capacitance of the carbonaceous material or the capacitance of the activated carbon, whichever is higher (activated carbon in this case), and if a content of the carbonaceous material 6 is 10% by mass or less, it is 95% or more thereof. It is found that the internal resistance of the electric double layer capacitor obtained by using the electrode materials 9 to 12 is markedly lower than the internal resistance of the electric double layer capacitor obtained by using either the carbonaceous material or the activated carbon.

As a result of evaluation at −30° C., the capacitance of the electrode material 9 became 100% or more of that of the carbonaceous material or the activated carbon, whichever is higher (activated carbon in this case), the internal resistance of the electric double layer capacitor using either the electrode material 9 or 10 became lower than the internal resistance of the electric double layer capacitor obtained by using either the carbonaceous material or the activated carbon, whichever is lower. However, the internal resistance of the electric double layer capacitor obtained by using the electrode materials 11 and 12 became higher than the internal resistance of the electric double layer capacitor obtained by using the activated carbon.

In comparison between results of low temperature properties in Table 2 and Table 3, it is found that in order to obtain a good low temperature property, a carbonaceous material obtained by thermal-treating or activating an extracted residue obtained by substantially extracting at least a part of fullerene from a fullerene-containing soot using a solvent is preferably used.

A detail of the reason why the internal resistance of the resultant electric double layer capacitors can be lowered while maintaining the large capacitance of the conventional activated carbon in the present invention is unknown, but it is considered as follows. Usually, an activated carbon particle has an angular, not a spherical shape. Therefore, if it is formed into a polarizable electrode, a void is easily formed between the activated carbon particles. However, a carbonaceous material used in the present invention has a substantially spherical shape. Thus, the carbonaceous material used in the present invention partially fills a space between the angular-shaped activated carbon particles, thereby enhancing electron conductivity in the electrode and reducing diffusional contribution of electrolyte solution ion. It is considered that the reduction in diffusion resistance results in lowering of resistance, so that a capacitance of a larger number of particles can be utilized.

INDUSTRIAL APPLICABILITY

In accordance with the present invention, an electrode material for electric double layer capacitor having a low internal resistance and a large capacitance can be obtained, and it can be suitably applied to an electrode for electric double layer capacitor and an electric double layer capacitor.

The invention claimed is:

1. An electrode material for an electric double layer capacitor comprising a carbonaceous material and an activated carbon, the carbonaceous material obtained by thermal-treating or activating a fullerene-containing soot or an extracted residue obtained by substantially extracting at least a part of fullerene from the fullerene-containing soot using a solvent, wherein a content of the carbonaceous material is 20% by mass or less, and wherein a capacitance of the electrode material for the electric double layer capacitor is 85% or more of a capacitance of the carbonaceous material or a capacitance of the activated carbon, whichever is higher.

2. The electrode material for an electric double layer capacitor according to claim 1, wherein the solvent is an aromatic organic solvent.

3. The electrode material for an electric double layer capacitor according to claim 1, wherein a content of the carbonaceous material is 15% by mass or less.

4. The electrode material for an electric double layer capacitor according to claim 1, wherein a content of the carbonaceous material is 10% by mass or less.

5. The electrode material for an electric double layer capacitor according to claim 1, wherein a resistance of the electrode material for the electric double layer capacitor is equivalent to or lower than a resistance of the carbonaceous material or a resistance of the activated carbon, whichever is lower.

6. The electrode material for an electric double layer capacitor according to claim 1, wherein the capacitance of the electrode material for the electric double layer capacitor is 95% or more of the capacitance of the carbonaceous material or the capacitance of the activated carbon, whichever is higher.

7. An electrode for an electric double layer capacitor comprising the electrode material according to claim 1.

8. An electric double layer capacitor comprising the electrode according to claim 7.

9. A process for producing the electrode material for the electric double layer capacitor according to claim 1, said method comprising:

blending a carbonaceous material and an activated carbon, the carbonaceous material obtained by thermal-treating or activating a fullerene-containing soot or an extracted residue obtained by substantially extracting at least a part of fullerene from the fullerene-containing soot using a solvent.

10. The electrode material for an electric double layer capacitor according to claim 2, wherein a content of the carbonaceous material is 10% by mass or less.

11. The electrode material for an electric double layer capacitor according to claim 10, wherein a resistance of the electrode material for the electric double layer capacitor is equivalent to or lower than a resistance of the carbonaceous material or a resistance of the activated carbon, whichever is lower.

12. The electrode material for an electric double layer capacitor according to claim 11, wherein the capacitance of the electrode material for the electric double layer capacitor is 95% or more of the capacitance of the carbonaceous material or the capacitance of the activated carbon, whichever is higher.

13. The electrode material for an electric double layer capacitor according to claim 1, wherein the fullerene-containing soot has a highest peak at a diffraction angle of around 27° C. when measured by X-ray diffraction.

14. The electrode material for an electric double layer capacitor according to claim 1, wherein the extracted residue has a highest peak at a diffraction angle of around 27° C. when measured by X-ray diffraction.

15. The electrode material for an electric double layer capacitor according to claim 1, wherein the electrode material is a material for a cathode, an anode, or a cathode and anode.

* * * * *